Oct. 14, 1924.
J. C. COLLIGAN
1,511,591
LIQUID SAMPLING APPARATUS
Filed Aug. 26, 1921
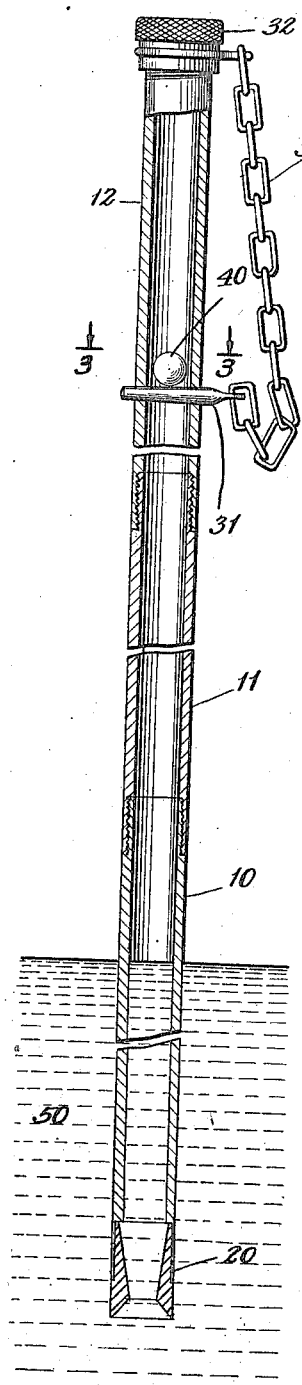
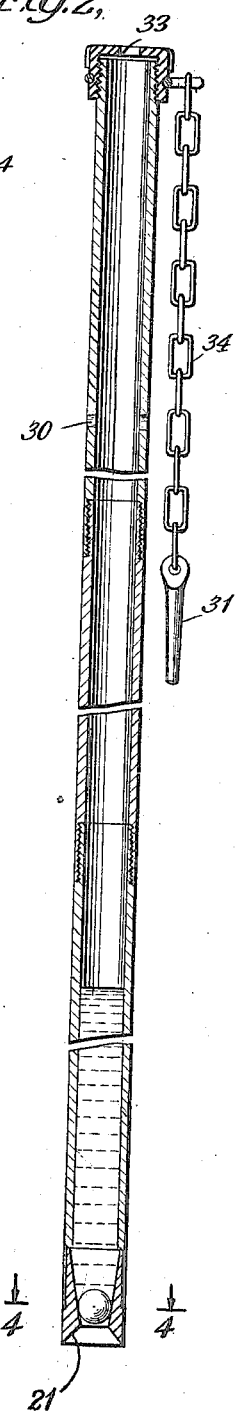
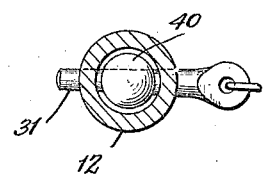
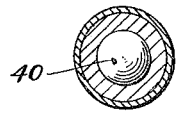
INVENTOR
John C. Colligan
ATTORNEY Patented Oct. 14, 1924.

1,511,591

UNITED STATES PATENT OFFICE.

JOHN C. COLLIGAN, OF DALLAS, TEXAS, ASSIGNOR TO THE TEXAS COMPANY, OF NEW YORK, N. Y., A CORPORATION OF TEXAS.

LIQUID-SAMPLING APPARATUS.

Application filed August 26, 1921. Serial No. 495,758.

*To all whom it may concern:*

Be it known that I, JOHN C. COLLIGAN, a citizen of the United States, residing in Dallas, county of Dallas, and State of Texas, have invented certain new and useful Improvements in Liquid-Sampling Apparatus, of which the following is a specification.

This invention relates to apparatus for obtaining samples of liquids whereby suitable inspection may be made of the contents of containers for liquids such as crude petroleum or gasolene, oil or other petroleum products.

The invention relates particularly to such containers as tank cars, ordinarily used for the transportation of petroleum or petroleum products in large quantities.

In the transportation of such materials, it is desirable to test the contents of the tank cars in order to determine if certain predetermined requirements are satisfactorily met thereby. Accordingly, it is the practice to withdraw a suitable quantity of the liquid and submit it to such tests and analyses as appear desirable.

The contents of tank cars being composed of petroleum products generally arrange themselves in accordance with the specific gravity of the several constituents, provided the car is stationary. When the car is in motion, however, the contents are agitated sufficiently to be thoroughly mixed, thus causing the mass to be homogeneous. It will be seen, therefore, that if a sample is taken, either from the surface of the liquid or by being sucked from the bottom of the container, the results of the test are dependent upon whether the sample was taken immediately after the car had been in motion or after the car had been stationary for a considerable period. Thus, such tests are not strictly accurate and do not reliably indicate the character of the whole of the contents of a particular car.

Broadly stated, it is the object of the present invention to provide an improved apparatus for withdrawing samples of the liquid contents of a tank car so that more accurate analyses thereof may be obtained.

In accordance with this object, a structure is provided which permits a predetermined portion of the contents of a car to be withdrawn without causing any material disturbance upon the car contents, so that the sample obtained is representative of the car contents, independent of any agitation to which the car may or may not have been previously subjected.

Another object relates to the provision of apparatus of such form that it may be readily inserted into a usual type of tank car.

A further object relates to sealing means for the apparatus, which may be readily and conveniently operated.

Other objects will appear as the description of the invention progresses.

Referring to the drawings:

Figure 1 shows a vertical section of the apparatus of the present invention inserted into a large quantity of liquid such as contained in a tank car, with the closure means in its normal, inactive, position.

Figure 2 shows the apparatus withdrawn from the tank car with the closure means sealed.

Figure 3 shows a section on the line 3—3 of Figure 1.

Figure 4 shows a section on the line 4—4 of Figure 2.

Like reference characters denote like parts in the several figures.

The preferred embodiment of my invention shown, comprises a plurality of sections of hollow pipe 10, 11, 12 screw-threaded to one another to form an elongated tube of substantially constant inside diameter through near its entire length.

The lowermost one of these sections 10 is provided at its free extremity with a chamber 20 having its inner passage of restricted diameter relative to the diameter of the pipe section 10. The lower opening of this chamber is beveled on its inner surface, as indicated at 21 in Figure 2.

Near the upper portion of the upper section 12 is a radial passage 30 through which may extend a tapered pin 31. The upper end of the upper section 12 is provided with a cap 32 having a suitable vent 33 whereby the interior of the tube is opened to the atmosphere. A chain 34 attached to the cap 32 and the pin 31, fastens the pin to the structure. A ball 40 of any suitable metal, having a diameter somewhat less than the inner diameter of the tubular sections 10, 11, 12 is adapted to ride therein but is arranged to be held by the restricted portion of the chamber 20, thereby forming a seal for the lower end of the tube.

The apparatus is set for use by having the ball 40 placed in the upper section 12 above the radial passage 30. The pin 31 is inserted in the passage 30 and maintains the ball 40 in such position. It is readily understood that the ball may be so set by inverting the structure and inserting the pin. For taking a sample of liquid such as 50 the structure is partially immersed therein. The beveled opening in the bottom of the extreme portion 20 permits the tube to be so inserted with a minimum disturbance of the liquid in the container. It will be seen that when the apparatus has been fully inserted, the portion of the liquid on the interior of the tube will correspond to the remaining portion so far as specific gravity and other characteristics are concerned.

The pin 31 is now withdrawn, thus releasing the ball 30 which falls by gravity to the restricted portion 20, as shown in Figure 2. The structure may now be withdrawn and since the ball 40 forms an effectual seal, the contents within the tube will be carried with it and may be used for such tests as are desired. The contents may be readily withdrawn into a suitable vessel (not shown) and the apparatus reset for a subsequent operation.

Apparatus of preferred form and construction has been illustrated and described for the purpose of showing a way in which this invention may be practiced; but the inventive thought upon which this application is based is broader than this illustrative embodiment. It is therefore understood that the scope of this invention is not to be limited by the present disclosure, reference being had to the appended claims for that purpose.

What is claimed is:

1. In apparatus for withdrawing liquids from a container, the combination of an elongated tube comprising a plurality of sections, the immersible portion of said tube having a chamber of restricted diameter and having beveled edges with a weight adapted to seal said chamber, and a removable pin for maintaining said weight above the level of the liquid.

2. In apparatus for withdrawing liquid from a container, the combination with an elongated tube having a radial passage through its walls above the level of the liquid, and having a cylindrical chamber of restricted diameter at or near its immersible end portion, of a ball-shaped element formed to seal said chamber against the escape of liquid, and a pin arranged to be retained in said passage for normally maintaining said element above the level of the liquid.

3. In apparatus for withdrawing liquid from a container, the combination with a plurality of tubes screw-threaded together to form a single tube, a hollow cylindrical chamber at the immersible end thereof of restricted diameter, said chamber having beveled edges whereby the apparatus may be inserted into a liquid without material disturbance of the liquid, a perforated cap for the non-immersible end of the tube, a pin, flexible means for securing said pin to the cap, the upper portion of the tube having a radial passage into which the pin may be inserted; of a ball-shaped element having a diameter less than the inner diameter of the tube but greater than the inner diameter of the restricted chamber, positioned within said tube.

4. Apparatus for withdrawing liquid from a container comprising an elongated tubular member having one end of restricted inner diameter, a spherical member adapted to close the opening in the end of restricted diameter, and removable means projecting through the tubular member for normally supporting the spherical member above the end of restricted diameter.

In witness whereof, I have hereunto set my hand this 19th day of August 1921.

JOHN C. COLLIGAN.